United States Patent [19]

Suzuki et al.

[11] 4,192,578
[45] Mar. 11, 1980

[54] METHOD OF PROJECTING A LINE IMAGE OF UNIFORM BRIGHTNESS

[75] Inventors: Masane Suzuki, Omiya; Kenzi Yasuda, Kitamoto, both of Japan

[73] Assignee: Fuji Photo Optical Co., Ltd., Saitama, Japan

[21] Appl. No.: 921,974

[22] Filed: Jul. 5, 1978

[30] Foreign Application Priority Data

Jul. 8, 1977 [JP] Japan .................................. 52-81751

[51] Int. Cl.² .............................................. G02B 27/14
[52] U.S. Cl. ...................................... 350/320; 350/171
[58] Field of Search ............. 350/171, 169, 163, 320; 356/371, 376, 381, 429, 354, 355, 356; 250/571, 572

[56] References Cited

U.S. PATENT DOCUMENTS

| 4,109,304 | 8/1978 | Khvalovsky et al. ............... 362/259 |
| 4,149,773 | 4/1979 | Reid ..................................... 350/163 |

*Primary Examiner*—Jon W. Henry

[57] ABSTRACT

A line image of uniform brightness is obtained from laser beam in spite of its Gaussian distribution of intensity about its optical axis by taking advantage of the fact that the intensity distribution is symmetrical. A laser beam emitted from a laser is diverged into a flat beam by means of a cylindrical lens. The flat beam is divided into two portions along a line passing normal to the flat beam through its optical axis. The two portions are projected onto the surface to be illuminated and superimposed thereon to form a line image cooperatively with each other. The two portions are superimposed so that the maximum intensity area of one portion falls on the minimum intensity area of the other.

4 Claims, 5 Drawing Figures

METHOD OF PROJECTING A LINE IMAGE OF UNIFORM BRIGHTNESS

BACKGROUND OF THE INVENTION

1. Field of the Invention

This invention relates to a method of projecting a line image of uniform brightness and more particularly to a method of projecting a laser beam line image having uniform brightness over the entire length thereof.

2. Description of the Prior Art

As one method for inspecting the surface evenness or the uniformity of thickness of web material, there has been known a method in which a line image is projected on the surface of the web material being transported as between two rolls. The line image is projected onto the surface in the direction normal to the direction of transport of the web material. The light reflected by the surface carries various information about the condition of the surface. For example, when the light is projected on a screen, the projected image of the light will be a straight line if the surface of the web material is completely flat across its width, while if the surface is not flat the projected image will be a curved line. Further, if there are scratches on some area of the surface, the brightness of the corresponding area of the projected image will be lowered. The projected image of the reflected light may be photographically recorded on a photosensitive film strip which is transported synchronously with the web material.

There has been known a method of projecting the line image utilizing a laser beam. In the conventional method, a laser beam emitted from a laser is first collimated by a collimator lens and then the collimated laser beam is diverged by a cylindrical lens to project onto a surface to be inspected.

The conventional method is disadvantageous in that the brightness of the projected line image is not uniform over the entire length thereof, since the laser beam emitted from the laser has a Gaussian distribution of intensity about its optical axis, and accordingly the intensity of the diverged beam is highest at its optical axis and is gradually lower toward its end portions. Therefore, the brightness of the projected line image is inherently highest at its center and lowest at its ends.

SUMMARY OF THE INVENTION

Accordingly, the primary object of the present invention is to provide a method of projecting a laser beam line image having uniform brightness over the entire length thereof.

In accordance with the present invention, a laser beam emitted from a laser is first collimated and diverged into a flat beam. The flat laser beam is divided into two portions along a line passing normal thereto through its optical axis. Each of the two portions has its highest intensity area at one end and its lowest intensity area at the other end. The two portions are superimposed again on the surface to be illuminated with the highest intensity area of one portion falling on the lowest intensity area of the other portion. The intensity distribution of the diverged laser beam is symmetrical about its optical axis. Accordingly, the intensity distribution of the two portions are mirror images of each other. Therefore, the line image obtained by superimposing two portions as described above has substantially uniform brightness over the entire length thereof.

DESCRIPTION OF THE PREFERRED EMBODIMENT

Figure 1:
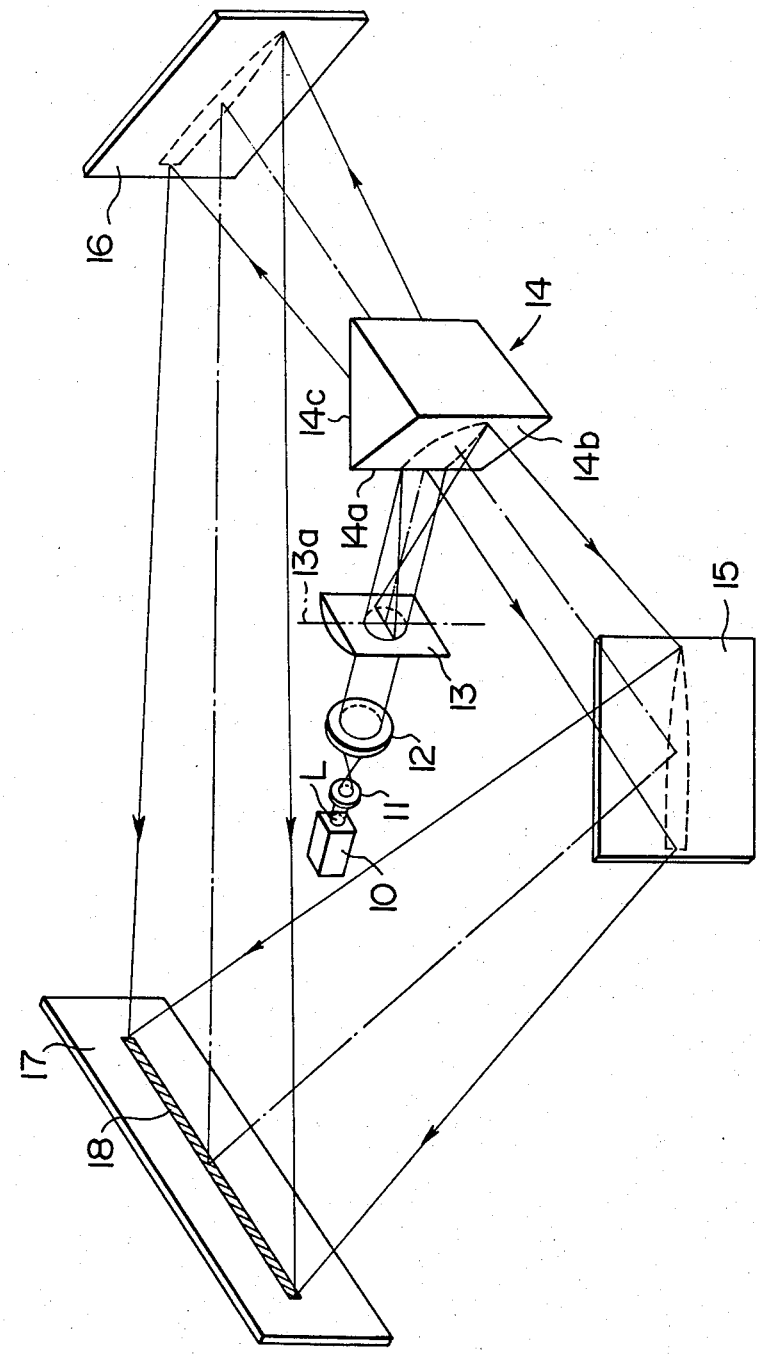
FIG. 1 shows an example of an optical system suitable for carrying out the method of this invention.

FIG. 1 shows an example of an optical system for carrying out the method of this invention.

In FIG. 1, a laser beam L is emitted from a laser 10. The laser beam L is expanded by a lens 11 so that the beam L is made circular in cross section. The expanded laser beam is subsequently collimated by a collimator lens 12 and is diverged into a flat beam by a cylindrical lens 13 having a longitudinal axis 13a. The diverged and flattened beam is reflected by a pair of reflecting surfaces 14b and 14c formed on adjacent faces of a prism 14. The prism 14 is positioned in the optical path of the beam so that the edge 14a between the reflecting surfaces 14b and 14c passes through the optical axis of the beam and extends in parallel to the axis 13a of the cylindrical lens 13. With this arrangement one half of the beam is reflected by the reflecting surface 14b and the other half of the beam is reflected by the reflecting surface 14c.

Figure 2:
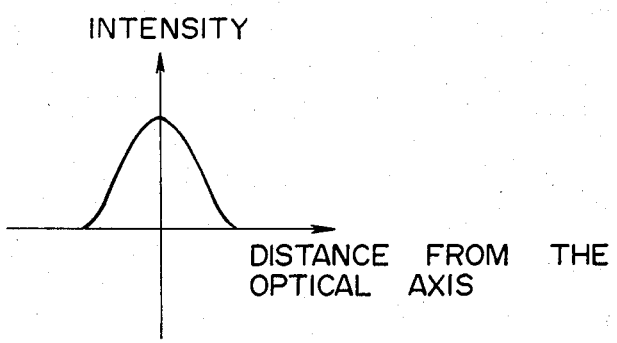
FIG. 2 is graph showing the distribution of intensity of a laser beam.

As is well known, the laser beam L emitted from the laser 10 has a Gaussian distribution of intensity in its cross section as shown in FIG. 2. That is, the intensity of the beam is maximum at its axis and is minimum at its outer edge.

Figure 3A:
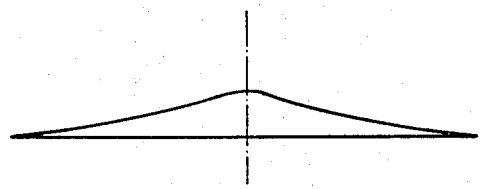
FIGS. 3A to 3C are schematic views for illustrating the principle of this invention.

Accordingly, the diverged and flattened beam also has its maximum intensity at the optical axis as shown in FIG. 3A. Also as can be seen from FIG. 3A, the intensity distribution of the diverged beam is symmetrical with respect to the optical axis.

Figure 3B:

Thus, said halves of the beam respectively reflected by the pair of reflecting surfaces 14b and 14 are symmetrical with each other with respect to their intensity distribution as shown in FIG. 3B.

Figure 3C:
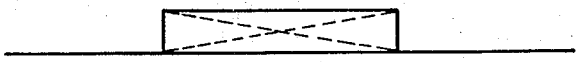

Again in FIG. 1, said one half of the beam reflected by the reflecting surface 14b is reflected by a reflecting mirror 15 and projected onto a surface of the material to be inspected, while the other half of the beam is reflected by a reflecting mirror 16 and projected onto the surface. The reflecting mirrors 15 and 16 are located so that the two halves are projected on the same area of the surface, i.e., the two halves are superimposed with each other to form one line image 18 together. As can be seen from FIG. 1 said half of the beam reflected by the reflecting surface 14b is projected on the surface of the material 17 with its maximum intensity portion positioned at the left end of the line image 18, while the other half reflected by the reflecting surface 14c is projected on the surface with its maximum intensity portion positioned at the right end of the line image 18. Thus the two halves are superimposed with the maximum intensity portion of one of them falling on the minimum intensity portion of the other as shown in FIG. 3C.

Therefore the brightness of the line image 18 is substantially uniform over the entire length thereof.

We claim:

1. A method of projecting a line image of uniform brightness onto a surface, comprising causing a laser beam to be emitted from a laser, diverging the emitted laser beam into a flat beam, the flat beam being symmetrical about its optical axis with respect to distribution of intensity, dividing the flat beam into two portions along a line passing normal thereto through its optical axis, said two portions being symmetrical to each other with respect to intensity distribution, and utilizing mirrors to reflect and project the two portions onto the surface to be superimposed with each other so that the maximum intensity area of one portion falls on the minimum area of the other portion, thereby forming a line image of uniform brightness on the surface.

2. A method as defined in claim 1 further including collimating the laser beam prior to diverging it.

3. A method as defined in claim 2 further including expanding the laser beam so that the laser beam is made circular in cross section.

4. A method as defined in claim 1 wherein the laser beam is diverged by means of a cylindrical lens.

* * * * *